(12) United States Patent
Ross

(10) Patent No.: US 8,524,351 B2
(45) Date of Patent: Sep. 3, 2013

(54) COMPOSITE PANEL

(75) Inventor: Leslie Ross, Aldershot (GB)

(73) Assignee: Zodiac Seats UK Limited (GB)

( * ) Notice: Subject to any disclaimer, the term of this patent is extended or adjusted under 35 U.S.C. 154(b) by 1373 days.

(21) Appl. No.: 12/158,851

(22) PCT Filed: Dec. 13, 2006

(86) PCT No.: PCT/GB2006/004655
§ 371 (c)(1),
(2), (4) Date: Sep. 30, 2008

(87) PCT Pub. No.: WO2007/071929
PCT Pub. Date: Jun. 28, 2007

(65) Prior Publication Data
US 2009/0297763 A1    Dec. 3, 2009

(30) Foreign Application Priority Data
Dec. 23, 2005    (GB) .................................. 0526312.4

(51) Int. Cl.
*B32B 3/12*    (2006.01)
*B32B 37/00*    (2006.01)

(52) U.S. Cl.
USPC .......... 428/116; 428/192; 156/60; 156/272.2; 156/308.2

(58) Field of Classification Search
USPC ................. 428/116, 117, 118, 119; 156/60, 156/308.2
See application file for complete search history.

(56) References Cited

U.S. PATENT DOCUMENTS

| 2,833,003 | A | * | 5/1958 | Bourne et al. | 52/800.13 |
| 3,703,422 | A | * | 11/1972 | Yoshino | 156/87 |
| 4,344,995 | A | * | 8/1982 | Hammer | 428/61 |
| 4,599,255 | A | * | 7/1986 | Anglin et al. | 428/73 |

(Continued)

FOREIGN PATENT DOCUMENTS

| DE | 196 04 611 A1 | 8/1997 |
| DE | 196 04 613 A1 | 8/1997 |

(Continued)

OTHER PUBLICATIONS

Mazumdar, Composites Manufacturing: Materials, product, and Process Engineering, CRC Press 2002, Technology and Engineering, p. 52.*

(Continued)

*Primary Examiner* — David Sample
(74) *Attorney, Agent, or Firm* — Dean W. Russell; Kilpatrick Townsend & Stockton LLP

(57) ABSTRACT

A door panel 1 has a peripheral frame 10 of extruded aluminum and a honeycomb core of plastics material tubes 11. An outer skin 2 of fiber-reinforced polyetherimide material is recessed with a pattern 3 formed in a preliminary operation of vacuum/pressure forming at elevated temperature. An inner skin 4 is plane. Edge channel members 5 of similarly formed, but thicker material are arranged around the edges of the door, enclosing the aluminum frame. A non-woven, polyester based scrim 6 extends across either side of the core and over the flanges 7 of the edge channels.

For bonding of the core, skin and edge channels together, the assembly is placed in a jig and compressed at elevated temperature in a heated press. The core is crushed at the recessed pattern 3 and the scrim melts and acts as a hot melt adhesive. On cooling of the press platens, the assembled door is removed from the jig.

17 Claims, 2 Drawing Sheets

(56) References Cited

U.S. PATENT DOCUMENTS

| | | | |
|---|---|---|---|
| 5,034,256 A * | 7/1991 | Santiso et al. | 428/116 |
| 5,102,723 A * | 4/1992 | Pepin | 428/223 |
| 5,149,574 A * | 9/1992 | Gross et al. | 428/116 |
| 5,455,096 A * | 10/1995 | Toni et al. | 428/116 |
| 6,180,206 B1 * | 1/2001 | Kain, Jr. | 428/116 |
| 2003/0003267 A1 | 1/2003 | Alts et al. | |
| 2009/0155502 A1* | 6/2009 | Cournoyer et al. | 428/34.1 |

FOREIGN PATENT DOCUMENTS

| | | |
|---|---|---|
| DE | 19604611 A1 * | 8/1997 |
| DE | 196 12 127 A1 | 10/1997 |
| EP | A1-0 649 736 | 4/1995 |
| EP | 418 046 A1 | 5/2004 |
| JP | 59-199129 | 11/1984 |
| JP | 6-344477 | 12/1994 |
| JP | 2006-090423 | 4/2006 |

OTHER PUBLICATIONS

Cunningham et al., The Effects of Various Design Parameters on the Free Vibration of Doubly Curved Composite Sandwich Panels, Journal of Sound and Vibration, 2000, 230, 2, p. 617-648.*

Murphy, The Reinforced Plastics Handbook, Elsevier, 1998, Technology and Engineering, p. 270-272.*

* cited by examiner

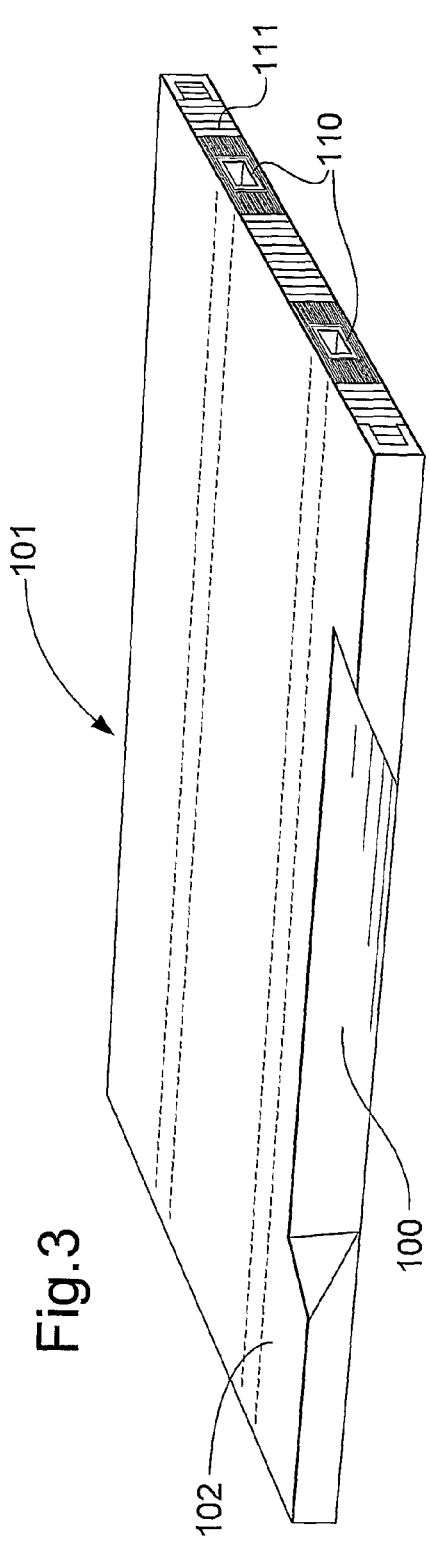
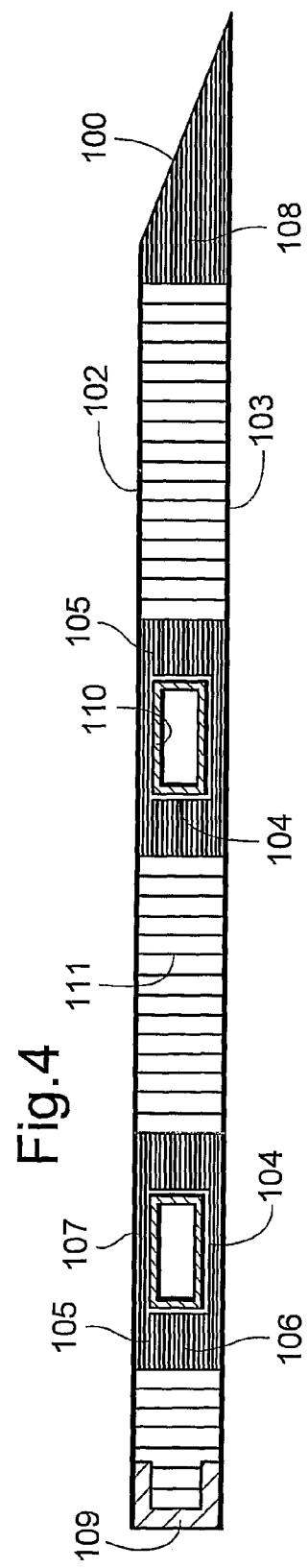

COMPOSITE PANEL

RELATED APPLICATIONS

This application claims benefit of PCT application publication number WO 2007/071929A1, filed 13 Dec. 2006 incorporated herein by reference, European patent application No. 1,418,046, incorporated herein by reference, and British national application 0526312.4 filed 23 Dec. 2005 also incorporated herein by reference.

FIELD OF THE DISCLOSURE

The present disclosure relates to a composite panel.

BRIEF DESCRIPTION OF THE DRAWINGS

To help understanding of the invention, a specific embodiment thereof will now be described by way of example and with reference to the accompanying drawings, in which:

FIG. 3 is a perspective view of a second composite panel in accordance with disclosure in one embodiment; and FIG. 4 is a cross-sectional view of the second panel in one form.

DESCRIPTION OF THE PREFERRED EMBODIMENTS

Figure 1:
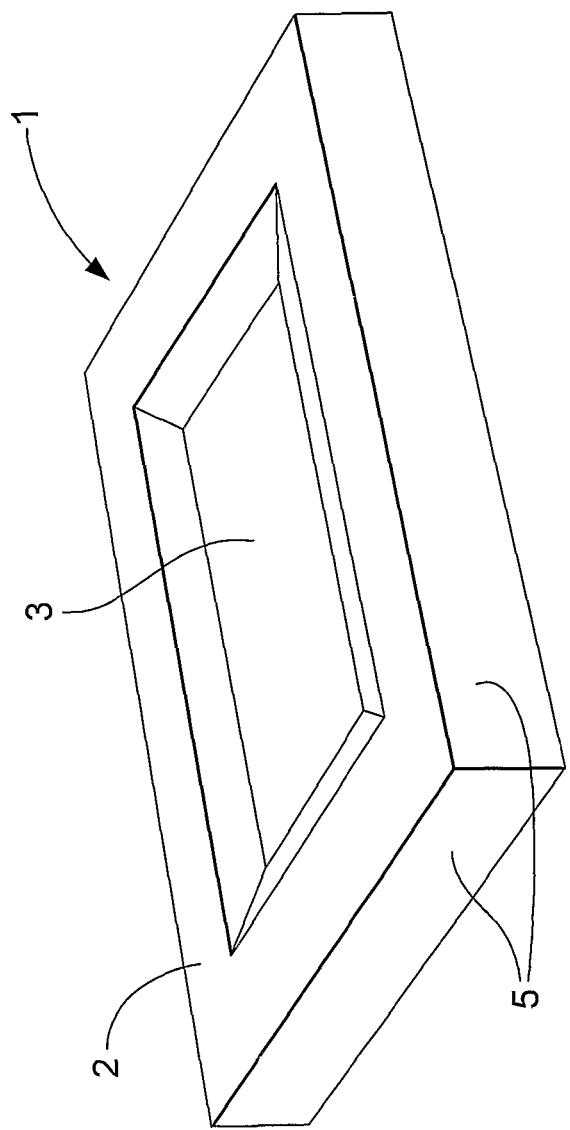
FIG. 1 is a perspective view of a first composite panel in accordance with the disclosure in one embodiment.

In our prior European patent application No. 1,418,046, incorporated herein by reference, we have disclosed a composite material based on polyetherimide material (PEI), having a honeycomb core of PEI tubes and skins of reinforced PEI laminae. The skins and the tubes are bonded together under elevated pressure and temperature.

Originally the material was directed to flat panels, having uniform cores.

According to one embodiment of the invention we provide a composite panel having a non-planar surface, the panel comprising:
   two skin laminae of reinforced polymer material, at least one of them having a non-planar surface with at least one area of it being recessed with respect to adjacent area(s) and
   a polymer honeycomb core of non-uniform thickness, the core being adhered to the skin laminae and crushed to a lesser thickness at the recessed area(s) of the non-planar skin lamina(e).

According to another embodiment of the invention we provide a composite panel having:
   two reinforced-polymer, skin laminae,
   a polymer honeycomb core and
   local reinforcement bonded inside at least one of the laminae.

In one form, the non-planar lamina is of PEI material, reinforced with glass fibre material. Conveniently, non-planar may be vacuum/pressure formed to shape at elevated temperature, prior to being pressed again at elevated temperature onto the core.

One embodiment of a local reinforcement is formed by a plurality of stacked small laminae bonded to each other, the local reinforcement being bonded to at least one of the skin laminae and/or the core.

Another embodiment of a local reinforcement is an elevated temperature vacuum/pressure forming, bonded to at least one of the skin laminae and/or the core. Conveniently, this reinforcement is of the same material as the skin laminae, preferably PEI material. Such a local reinforcement is particularly useful where internal metal anchorages for equipment to be secured the panel are desirable with the anchorage being partially surrounded by and located in the panel reinforcement.

Bonding of either form of local reinforcement can be achieved in one form by compression at elevated temperature, in like manner to bonding of the laminae to the core. In one form an adhesive material is employed between the laminae and the reinforcement.

A further embodiment of a reinforcement is a thermoset moulding. In particular such a moulding can be used at an edge of the panel.

Conveniently, the reinforcements in one form can be bonded in position with the interposition between themselves and the skin laminae of an elevated temperature adhesive material. Whilst conventional adhesives can be used, an embodiment is disclosed wherein adhesive material is a scrim of non-woven polyester material.

Figure 2:
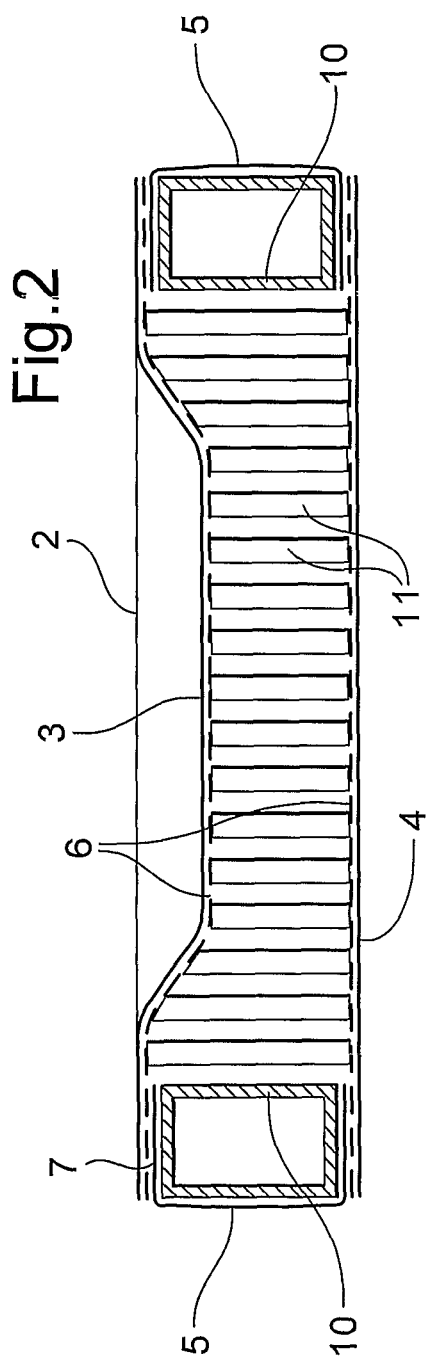
FIG. 2 is a cross-sectional view of the first panel in one form.

According to another embodiment, there is provided a method of forming a panel comprised of two reinforced-polymer, skin laminae and a polymer honeycomb core and having a non-planar surface, the method consisting in the steps of:
   forming the or each skin lamina with a non-planar surface having at least one area of it recessed with respect to adjacent area(s);
   assembling the skin laminae on opposite sides of the polymer honeycomb core;
   compressing the assembly at elevated temperature to crush the core to a lesser thickness at the recessed area(s) of the non-planar, skin lamina; and
   cooling the compressed assembly to adhere the core to the skin laminae and set it in its crushed state.

to Referring to FIGS. 1 & 2, a door panel 1 in one form will now be described. It has a peripheral frame 10 of extruded aluminium and a honeycomb core of plastics material tubes 11. An outer skin 2 of fibre-reinforced polyetherimide material is recessed with a pattern 3 formed in a preliminary operation of vacuum/pressure forming at elevated temperature. An inner skin 4 is planar in one form.

Edge channel members 5 of similarly formed, but thicker material may be arranged around the edges of the door, enclosing the aluminium frame. A non-woven, polyester based scrim 6 extends across either side of the core and over the flanges 7 of the edge channels.

For bonding of the core, skin and edge channels together, the assembly just described is placed in a jig and compressed at elevated temperature in a heated press. The core is crushed at the recessed pattern 3 and the scrim melts and acts as a hot melt adhesive. On cooling of the press platens, the assembled door may be removed from the jig.

Referring on now to FIGS. 3 & 4, a floor panel 101 is thereshown. It has upper and lower skins 102, 103, of which the upper is shaped in like manner to door skin 2 to provide a ramp 100 for access of trolleys onto the panel, when in use as an aircraft seat pallet. The pallet should have its seat secured to it and in turn be secured to the craft's air frame. For this internal aluminium extrusions 110 are provided. Elsewhere, the skins may be joined together by the honeycomb core 111.

The extrusion in one form are contained in top-hat section formings 104. Their flanges 105 are supported to the opposite skin by a stack of strips 106 of the same laminar PEI material, with a further reinforcing strip 107 providing additional closure across the flanges 105. The strips have interleaved hot-melt scrims—not shown. A similar, tapered stack of strips 108 provides a reinforcement of the skins where they taper towards each other at the ramp 100. At the same edge of the panel, on either side of the ramp and at the opposite edge, the skins are joined together by glass reinforced thermoset plastic material mouldings 109, individually contoured to the taper of the air frame. As with the door panel 1, the floor panel is bonded in a jig and a press at elevated temperature.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of the applicants' general concept.

The invention claimed is:

1. A composite panel having:
    two skin laminae of reinforced polymer material;
    a polymer honeycomb core;
    at least one local reinforcement; wherein the local reinforcement is: i) bonded inside of at least one of the skin laminae to at least one of the skin laminae and the core; ii) made up of a plurality of stacked pieces of laminar material bonded to each other; and ii) formed at an elevated temperature vacuum/pressure;
    one or more metal anchorage members internal to the panel and at least partially surrounded by, and located in, the panel by said local reinforcement, and in which at least one of the one or more metal anchorage members does not contact either of the two skin laminae.

2. A composite panel according to claim 1, having a non-planar surface,
    wherein at least one of the two skin laminae of reinforced polymer material has a non-planar surface with at least one area of it being recessed with respect to adjacent area(s) and wherein the polymer honeycomb core is of non-uniform thickness, the core being adhered to the skin laminae and crushed to a lesser thickness at the recessed area(s) of the non-planar skin lamina(e).

3. A composite panel according to claim 1, wherein the recessed area is an indented area of the panel in which the panel is thinner than in adjacent area(s).

4. A composite panel according to claim 1, wherein the recessed area is a tapered area of the panel in which the panel tapers to an edge of the panel.

5. A composite panel according to claim 1, wherein the non-planar lamina is of PEI material, reinforced with glass fibre material.

6. A composite panel according to claim 1, wherein at least one non-planar skin lamina is vacuum/pressure formed to shape at elevated temperature, prior to being pressed again at elevated temperature onto the core.

7. A composite pane according to claim 1, wherein the local reinforcement is comprised of the same material as the skin laminae.

8. A composite panel according to claim 1, wherein the panel further comprises a thermoset moulding, bonded to at least one of the skin laminae and/or the core.

9. A composite panel according to claim 8, wherein the thermoset moulding forms an edge of the panel.

10. A composite panel according to claim 1, wherein each local reinforcement is bonded in position with the interposition between the local reinforcement(s) and the skin laminae of an elevated temperature adhesive material.

11. A composite panel as claimed in claim 10, wherein the adhesive material is a scrim of non-woven polyester material.

12. A composite panel as in claim 1, in which the one or more metal anchorage members are permanently located in the panel by said local reinforcement.

13. A composite panel as in claim 1, wherein the panel is a door panel for an aircraft.

14. A composite panel as in claim 1, wherein the panel is a floor panel for an aircraft.

15. A composite panel as in claim 1, wherein the panel is an aircraft seat pallet.

16. An aircraft seat pallet comprising the composite panel of claim 1.

17. A method of forming a composite panel, comprising the steps of:
    providing one or more metal anchorage members and two skin laminae of reinforced polymer material;
    locating the one or more metal anchorage members in the panel by at least one local reinforcement; and
    bonding the at least one local reinforcement to at least one of the skin laminae and the core, thereby forming a composite panel including (i) the two skin laminae, (ii) a polymer honeycomb core, (iii) the at least one local reinforcement, which is bonded inside of at least one of the skin laminae to at least one of the skin laminae and the core, made up of a plurality of stacked pieces of laminar material bonded to each other, and formed at an elevated temperature vacuum/pressure, and (iv) the one or more metal anchorage members internal to the panel and at least partially surrounded by, and located in, the panel by said local reinforcement, in which at least one of the one or more metal anchorage members does not contact either of the two skin laminae.

* * * * *